Figure 1:
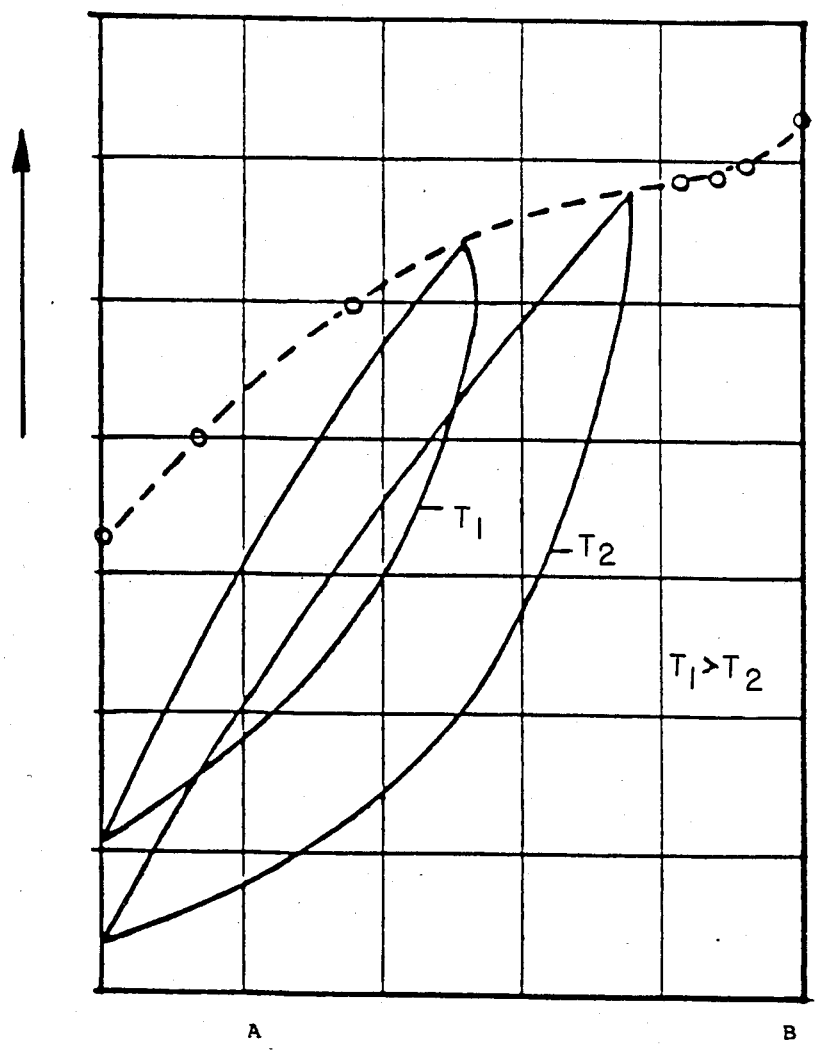

United States Patent [19]

Beneke et al.

[11] Patent Number: 4,806,228

[45] Date of Patent: Feb. 21, 1989

[54] PROCESS FOR PRODUCING PITCH RAW MATERIALS

[75] Inventors: Herbert Beneke, Castrop-Rauxel; Siegfried Peter, Uttenreuth-Weiner, both of Fed. Rep. of Germany

[73] Assignee: Rutgerswerke AG, Fed. Rep. of Germany

[21] Appl. No.: 1,013

[22] Filed: Jan. 7, 1987

[30] Foreign Application Priority Data

Feb. 7, 1986 [DE] Fed. Rep. of Germany ....... 3603883

[51] Int. Cl.$^4$ .................. C10C 1/20; C10C 1/18
[52] U.S. Cl. ................................ 208/45; 208/433; 208/22
[58] Field of Search ................ 208/22, 45, 433

[56] References Cited

U.S. PATENT DOCUMENTS

| Re. 32,120 | 4/1986 | Low | 208/433 |
|---|---|---|---|
| 2,572,583 | 10/1951 | Antle | 208/45 |
| 3,087,887 | 4/1963 | Corbett et al. | 208/45 |
| 3,202,605 | 8/1965 | Redcay | 208/45 |
| 4,036,731 | 7/1977 | Martin | 208/433 |
| 4,101,416 | 7/1978 | Dulbear | 208/45 |
| 4,127,472 | 11/1978 | Migitaka et al. | 208/45 |
| 4,184,942 | 1/1980 | Angier et al. | 208/45 |
| 4,208,267 | 6/1980 | Diefendorf et al. | 208/45 |
| 4,219,404 | 8/1980 | Dickakian | 208/22 |
| 4,259,171 | 3/1981 | Stedelhofer | 208/45 |
| 4,390,411 | 6/1983 | Scinta et al. | 208/433 |
| 4,402,824 | 9/1983 | Sunami et al. | 208/45 |
| 4,482,453 | 11/1984 | Coombs et al. | 208/45 |
| 4,502,943 | 3/1985 | Dickakian | 208/45 |
| 4,503,026 | 3/1985 | Dickakian | 433/447.4 |
| 4,517,072 | 5/1985 | Cukier et al. | 208/45 |
| 4,559,133 | 12/1985 | Siegfried et al. | 208/424 |
| 4,578,177 | 3/1986 | Yudate et al. | 208/45 |
| 4,604,184 | 8/1986 | Cukier et al. | 208/45 |
| 4,620,919 | 11/1986 | Yemura et al. | 208/45 |

Primary Examiner—H. M. Sneed
Assistant Examiner—Helane Myers
Attorney, Agent, or Firm—Bierman and Muserlian

[57] ABSTRACT

A process for the production of pitch raw materials having improved properties comprising extracting coaltar pitch free of solids with a mixture of a supercritical gas extracting agent and an entrainer at elevated temperatures and pressures, passing the extraction mixture to a plurality of separation steps where the supercritical gas and entrainer are removed by lowering the pressure and/or raising the temperature, recycling the mixture of extracting agent and entrainer to the extraction step and recovering the pitch fractions from the separation step, the said pitch fractions being useful for diverse purposes such as soot production, electrode bonding agents, etc.

20 Claims, 2 Drawing Sheets

PROCESS FOR PRODUCING PITCH RAW MATERIALS

STATE OF THE ART

Coal-tar pitches are characterized by their fusion point (FP), their coking residue, their solubility in different solvents, their content of ash-constituents and if necessary by their density and the outcome of their distillation. Up to now, it was customary to vary these properties by the selection of suitable crude tars, by mechanical removal of solids—ash-constituents and quinoline insolubles (QI)—and thermal treatment. If suitable crude tars are not available in sufficient quantity, then the content of undesired constituents must be reduced in the crude tars by centrifuging, filtering or promoter-accelerated gravity settling. By doing so, these constituents are often only partially and inadequately removed, and other desirable constituents are lost. The pitches obtained by the subsequent fractionating distillation do not always correspond to the desired application-oriented specifications so that further process steps, for instance a thermal treatment, are required.

Numerous processes are also known which remove the undesired constituents directly from the pitch instead of from the tar, but, the processes used are comparable. For instance, a process is known from DE-AS 21 21 458 for obtaining different pitches from tars through a two-step thermal treatment under pressure with subsequent distillation, which in a mixture correspond e.q. to the various specifications of electrode binding agents and impregnating agents. However, valuable oils are converted into pitch by the thermal treatment of the tars and oils from the first treatment step.

It is known to extract coal tar with supercritical ethylene (M & B monograph CE/5, (1971), pp. 43 and 44) and at 298° K. and 300 bars, 40 wt % of a pitch residue remains.

In DE-AS 14 93 190, the separation of naphthalene and anthracene by extraction with supercritical ethylene is described but the use of this separation process for coal-tar pitch, is not suggested by this. Rather, the high-boiling residue allows the inference that ash removal from pitches by extraction with supercritical gases is not possible without great losses.

The extraction of pitches with supercritical gases for separating out undesired pollutants is described in Polish Pat. No. 127 934 in which the solvents should have a critical temperature of more than 30° C. and a critical pressure of at least 40 bars. Preferably toluene, propane and crude benzene are suggested as solvents. The separation of ashes and anthracene-oil insolubles, which correspond approximately to the quinolines insolubles (QI), only succeeds completely with the use of crude benzene at 320° C. and 105 bars, but, the yields are low at 52 wt%. A further disadvantage of the process is that 94.2 wt. % of the benzene insolubles present in the original pitch remain in the residue. The extracted pitch is therefore not usable for many applications in which a high content of β-resins (difference between benzene insolubles and quinoline insolubles) is required, as in the case of electrode binding agents.

OBJECTS OF THE INVENTION

It is an object of the invention to provide a process to fractionate any coal-tar pitch without thermal treatment to obtain fractions of pitch raw materials which are useful for all known applications.

It is a further object of the invention to use the individual pitch fractions in various processes.

These and other objects and advantages of the invention will become obvious from the following detailed description.

THE INVENTION

The novel process of the invention for the production of pitch raw materials having improved properties comprises extracting coal-tar pitch free of solids with a mixture of a supercritical gas extracting agent and an entrainer at elevated temperatures and pressures, passing the extraction mixture to a plurality of separation steps where the supercritical gas and entrainer are removed by lowering the pressure and/or raising the temperature, recycling the mixture of extracting agent and entrainer to the extraction step and recovering the pitch fractions from the separation step.

Examples of the supercritical gas extracting agent are aliphatic or olefinic hydrocarbons, preferably of 2 to 5 carbon atoms, and halogenated hydrocarbons of 1 to 4 carbon atoms and mixtures thereof above their critical temperature and critical pressure.

Examples of suitable entrainers are mono- and polynuclear aromatic hydrocarbons optionally substituted with alkyl groups, especially with up to 2 carbon atoms, or with an amino group, and which can be not only aromatic but also totally or partially hydrogenated. It is also possible to use mono- or binuclear heterocyclic compounds, especially heterocyclic compounds containing nitrogen, in which one nucleus or both nuclei are heterocyclic, and alkyl esters of aromatic carboxylic acids and alcohols with preferably 1 to 6 carbon atoms in the alcohol. Suitable entrainers are for instance crude benzene, commercial benzene, platformate cuts with a boiling range between 70° and 200° C., preferably between 100° and 150° C., methylnaphthalene and methylnaphthalene fractions as well as mixtures thereof.

The extraction step is preferably carried out under temperature and pressure conditions which lie above the critical pressure and the critical temperature of the supercritical gas, but below the critical temperature of the entrainer. Generally, these pressures are between 80 and 300 bars and the temperatures are in the range from 80° to 300° C. Preferably, the pitch is extracted under a pressure from 150 to 250 bars at a temperature from 120° to 250° C. In so doing, a single-phase mixture of pitch, entrainer and supercritical gas is produced and the undissolved solids sediment can be separated out. By the process of the invention, up to 94 wt. % can be extracted from coal-tar pitches at significantly lower temperatures.

Removal of solids by extraction with a supercritical gas and an entrainer is known for shale oils with about 25% solids [D. Stützer: Zur Abtrennung von feinen Feststoffen aus einem viskosen Schieferöl mit Hilfe der überkritischen Fluidextraktion, Dissertation Erlangen 1983] and the separation of solids is successful to 97.2 wt. % with an oil yield of 77.2%. Because of the high solids content of about 25 wt. % and the predominantly paraffinic-olefinic composition of the shale oil with a boiling range of 200° to 360° C., this starting product is not comparable to the highly aromatic high-boiling coal tar pitch.

The concentration of pitch in the extracting mixture consisting of entrainer and supercritical component is determined not only by the proportion of solvent but also by the pressure and temperature of the system. Since the viscosity and density of the supercritical solution of pitch in the extracting mixture increases with increasing pitch content, and the sedimentation of the solids is thereby retarded, it is expedient to limit the pitch concentration to about 2 to 40 wt. %, preferably in the range of 5 to 30 wt. %. Due to the low viscosity of the supercritical extracting mixture, the sedimentation of the solids follows so rapidly that no mechanical agents are necessary for removing the solids from the supercritical fluid phase.

Figure 2:
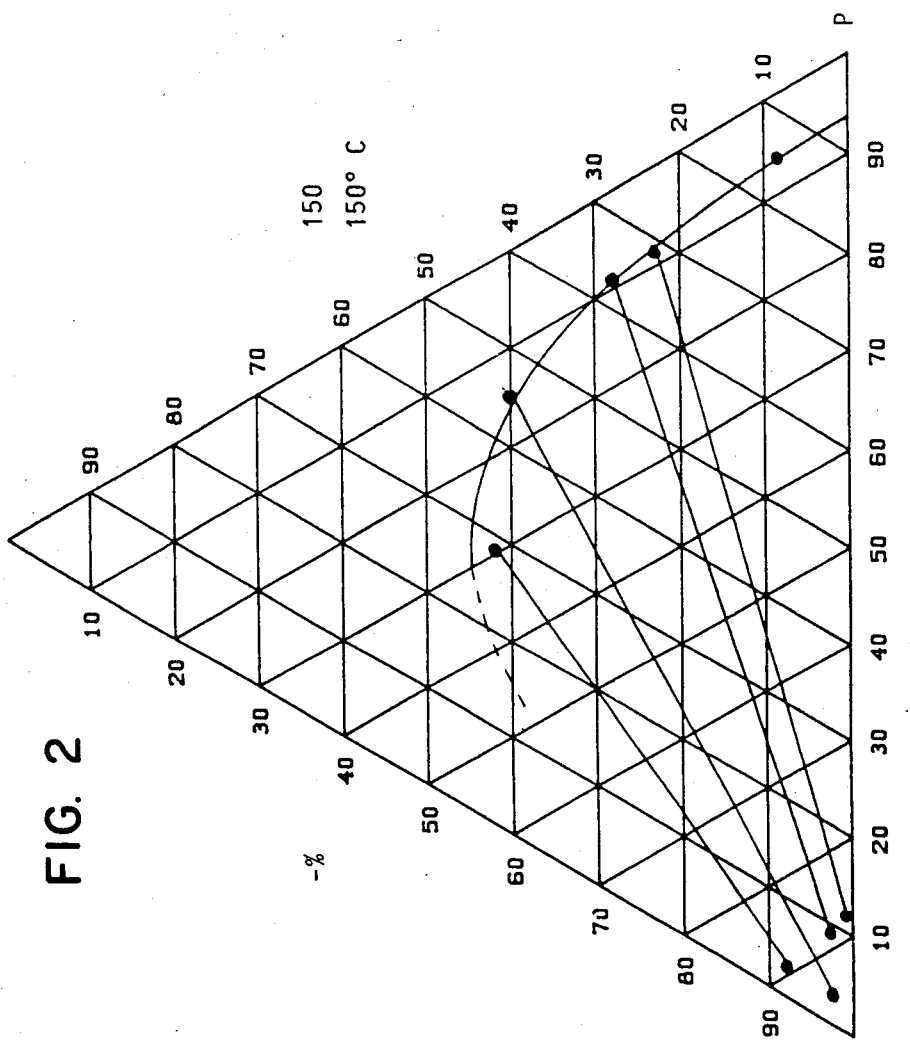

Referring to the drawings, FIG. 1 is a pressure-concentration diagram showing the phase boundary lines of a solvent consisting of an entrainer and a supercritical component at two different temperatures, and FIG. 2 is the system of normal coal-tar pitch, toluene and propane at 150° C. and 150 bars.

The solvent consisting of the entrainer and the supercritical component is supercritical under the conditions of the extraction, i.e. its phase point lies above the critical curve of the binary or quasi-binary system as illustrated in FIG. 1. The phase boundary lines are recorded for a few temperatures in the pressure-concentration diagram. In the region of the critical temperature of the entrainer and the critical temperature of the supercritical component, the phase boundary lines have the form of a curve which ends at the coordinate of the subcritical entrainer. The tie line of the critical points, at which the phase boundary lines for the liquid and gaseous phase touch one another, the critical curve of the system is drawn in, and it extends from the critical point of the pure component A to the critical point of the pure component B. Such a system is designated as a system with a closed critical curve and in the process of the invention, entrainer and supercritical component are selected so that they form a system with a closed critical curve.

Surprisingly, not only the light constituents of the pitch, i.e. those soluble in toluene (TS), but also the constituents insoluble in toluene (TI) and even those insoluble in quinoline (QI) dissolve in the extracting mixture. In the triangular phase diagram of FIG. 2, the phase behavior of the quasi-ternary system normal pitch toluene, propane at 150° C. and 150 bars is represented graphically as an example. At contents of more than 50 wt. % of toluene, the system is single-phase under these conditions. The perimeter of the two-phase region depends upon pressure, temperature and the choice of entrainer and supercritical component. The pressure region lies between 100 and 300 bar, preferably between 150 and 250 bar.

In process of the invention, the recovery of the extracting mixture loaded with normal pitch can be effected by heating and/or by reducing the pressure. The recovery is carried out in a series of steps where the density of the extracting agent is gradually reduced by raising the temperature and/or lowering the pressure. Consequently, the dissolved pitch constituents separate out as fractions. First the constituents with the lowest solubility separate out, then the somewhat more soluble, etc., until finally the readily soluble constituents also precipitate and the extracting mixture is fully recovered and can be recycled to the extraction apparatus.

In the following examples there are described several preferred embodiments to illustrate the invention. However, it is to be understood that the invention is not intended to be limited to the specific embodiments.

EXAMPLE 1

200 g of a normal pitch having 0.23% by weight of ash constituents, 5.8% by weight of quinoline insolubles (QI), 22.8% by weight of toluene insolubles (TI) and a fusion point (FP) of 70° C. [determined by Kraemer-Sarnow (K-S)] were placed in a stirred autoclave and heated to 150° C. Then, a mixture of 30% by weight of propane and 70% by weight of toluene as extracting agent and entrainer respectively was passed through the autoclave with stirring at a pressure of 180 bar. The extracting agent is supercritical under these conditions and dissolves the pitch up to a concentration of about 10% by weight and transports the pitch out of the autoclave. The flow rate of the gaseous extracting agent was 2.2 liters per hour.

The extracting agent concentrated with the pitch was transported to three consecutive recovery autoclaves whereby the pressure was gradually returned to 50 bar and the recovery temperature was 150° C. Cooling occuring due to the release of pressure because of Joule-Thomson effect is compensated for by heating. The recovered mixture of extraction agent and entrainer is recycled to the first autoclave and after an extraction time of 5 hours, the pitch fractions of the following table were recovered.

TABLE I

| Fraction No. | Autoclave pressure bars | Yield wt. % | Ash content wt. % | QI wt. % | TI-QI wt. % | TS wt. % |
|---|---|---|---|---|---|---|
| 1 | 180 | 13 | 1.8 | 44.0 | 53.7 | 2.3 |
| 2 | 140 | 32 | 0 | 0.1 | 39.6 | 60.3 |
| 3 | 100 | 35 | 0 | 0.1 | 9.0 | 90.9 |
| 4 | 50 | 20 | 0 | 0 | 0.1 | 99.9 |

Fraction 1 is the extraction residue which is fluid under pressure remaining in the agitating autoclave and Fraction 4 consists only of toluene solubles (TS).

EXAMPLE 2

2 kg of normal pitch [FP (K.-S.)=72° C., ash-constituent=0.23 wt. %, QI=5.8 wt. %, TI=22.7 wt. %] were placed in a stirred 10 liter autoclave and the autoclave was heated to a temperature of 190° C. At a pressure of 200 bars, a mixture of 50 wt. % propane and 50 wt. % toluene as extracting agent and entrainer was directed with stirring through the autoclave at a flow rate of the extracting agent, supercritical under these conditions, of 14 l/h. During an extraction time of about 70 minutes, the average charge of the extracting agent was about 15 wt. %. The extracting agent loaded with pitch was transported into three consecutive recovery autoclaves and the pressure was gradually reduced to 50 bars and the temperature in the recovery autoclave was held to 190° C. The recovered mixture of toluene and propane was recycled to the stirred autoclave and the following pitch fractions were obtained.

TABLE II

| Fraction No. | Autoclave pressure bars | Yield wt. % | Ash content wt. % | QI-Ashes wt. % | TI-QI wt. % | TS wt. % |
|---|---|---|---|---|---|---|
| 1 | 200 | 7 | 3.2 | 72.0 | 19.5 | 5.3 |
| 2 | 150 | 28.5 | 0 | 2.7 | 55.7 | 41.6 |
| 3 | 100 | 39.8 | 0 | Tr. | 13.6 | 86.4 |
| 4 | 50 | 24.7 | 0 | 0 | Tr. | 99.9 |

EXAMPLE 3

Example 2 was repeated with crude benzene as entrainer and liquefied petroleum gas (LPG) at a flow rate of 25 l/h and the following pitch fraction were obtained.

TABLE III

| Fraction No. | Autoclave pressure bars | Yield wt. % | Ash content wt. % | QI-Ashes wt. % | TI-QI wt. % | TS wt. % |
| --- | --- | --- | --- | --- | --- | --- |
| 1 | 200 | 6 | 3.7 | 85.0 | 8.5 | 2.8 |
| 2 | 190 | 8.5 | 0 | 8.2 | 75.5 | 16.3 |
| 3 | 130 | 31.1 | 0 | Tr. | 50.8 | 49.1 |
| 4 | 50 | 54.4 | 0 | 0 | Tr. | 99.9 |

The extraction residue of Fraction 1 was a powdery solid after the pressure reduction.

EXAMPLE 4

Example 2 was repeated at a temperature of 150° C. with propane as the carrier gas and toluene as the entrainer at the temperatures and pressures specified in the following table and the fractions with the specified properties were obtained:

TABLE IV

| Fraction No. | Autoclave pressure bars | Yield wt. % | Ash content wt. % | QI-Ashes wt. % | TI-QI wt. % | TS wt. % |
| --- | --- | --- | --- | --- | --- | --- |
| 1 | 200 | 5.9 | 3.4 | 33.6 | 60.3 | 2.7 |
| 2 | 150 | 33.5 | Tr. | 13.4 | 46.0 | 40.6 |
| 3 | 130 | 26.2 | Tr. | <0.1 | 6.1 | 93.8 |
| 4 | 80 | 34.4 | Tr. | Tr. | Tr. | 99.9 |

EXAMPLE 5

Example 4 was repeated and the following fractions were obtained at varied pressures:

TABLE V

| Fraction No. | Autoclave pressure bars | Yield wt. % | Ash content wt. % | QI-Ashes wt. % | TI-QI wt. % | TS wt. % |
| --- | --- | --- | --- | --- | --- | --- |
| 1 | 200 | 5.9 | 3.4 | 33.6 | 60.3 | 2.7 |
| 2 | 165 | 18 | Tr. | 25 | 61.2 | 13.8 |
| 3 | 145 | 21 | Tr. | <0.1 | 29.0 | 71.0 |
| 4 | 80 | 55.1 | Tr. | Tr. | Tr. | 99.9 |

The fractionation was significantly improved when extraction columns were used instead of the recovery autoclave and after lowering the pressure and/or raising the temperature, the gas phase in the extraction columns may be countercurrent directed to the separated pitch fraction. However, for most applications this fractionation was not necessary. Obtaining a toluene-soluble, a quinoline-soluble and an ash-free pitch fraction satifies the set standards so that the expenditure for the apparatus necessary for better fractionation is not justified.

Mixtures of fractions 1 and 2 in Examples 1 to 5 can be added in amounts up to 10% of a coking blend to improve the progress of the coking.

EXAMPLE 6

A mixture of 70 wt. % of a highly volatile coal [37% volatiles free of water and ash, int. classification No. 632] and 30 wt. % of a weakly coking coal [19% volatiles free of water and ash, int. classification No. 332] was mixed with 4 or 8% by weight of a mixture of 50 wt.% of fraction 1 and 50 wt. % of fraction 2 of Example 1 and 7 kg of the mixture was coked in a test furnace at 1000° C. and with a coking time of 5 hours. The following results were achieved:

| Furnace charge | Micum indices of the cokes produced | |
| --- | --- | --- |
| | M 10 | M 30 |
| Coking blend without additive | 11.5 | 78 |
| Coking blend with 4% pitch fraction | 10 | 84 |
| Coking blend with 8% pitch fraction | 10 | 88 |

Fraction 4 of Examples 1 to 5, alone or mixed with high-boiling aromatic hydrocarbon fractions which are known as soot oils, can serve as a raw material for the production of soot. Because of the high Bureau of Mines Correlation Index (BMCI), the quality of soot oils derived from petroleum was thus improved.

EXAMPLE 7

50 parts by weight of a pitch fraction corresponding to fraction 4 of Example 3 were dissolved in 50 parts by weight of hot filtered anthracene oil and the mixture has a BMCI of 179. A standard gum soot in an approximately 50% yield was produced from the mixture in a furnace reactor under customary conditions.

Mixtures of the nearly QI-free fractions 3 and 4 of Examples 1 to 5 may be used as raw material for the production of needle coke or as impregnating agents for molded carbon objects such as electrodes and anodes. By varying the mixture proportions, the viscosity and coking residue of the impregnating agent was effectively influenced.

EXAMPLE 8

38 parts by weight of a pitch corresponding to fraction 3 of Example 3 and 62 parts by weight of a pitch fraction corresponding to fraction 4 of Example 2 were mixed in the liquid state and the ash-free mixture has the following properties:

| | |
| --- | --- |
| FP (K. — S.) | 67° C. |
| QI | 0.1% |
| TI | 19.3% |
| Coking residue (Conradson) | 50.3% |
| Density 20° C. | 1.28 g/cm$^3$ | and was used as an impregnating agent for steel making electrodes.

Mixtures of fractions 2, 3 and 4 could be used as electrode binding agents and here also binding agents with any desired specifications may be produced through the choice of mixture proportions.

EXAMPLE 9

Pitch fractions corresponding to fractions 2, 3 and 4 of Example 5 were mixed as fluids to produce electrode binding agents free of ash. To adjust the fusion point, fraction 4 was subjected to a careful vacuum distillation to obtain 5 wt. % of an oil and the residue was designated as fraction 4*.

| Mixture proportion Fr.2:Fr.3:Fr.4* | FP (K. − S.) °C. | QI wt. % | TI wt. % | Coking residue (Conradson) wt. % |
| --- | --- | --- | --- | --- |
| 32:47:21 | 80 | 8 | 33 | 53 |
| 52:21:27 | 82 | 13 | 38 | 55 |
| 68:4:28 | 85 | 17 | 43 | 57 |

As can be understood from the Table, all known types of binding agents can be mixed free of ashes from the fractions produced by the invention. In addition, numerous possiblities of use are apparent for the pitch raw materials produced by the invention, such as plasticized pitches, pitch-plastic combinations, pitch emulsions, binding agents for road construction, steel making tars and coal-tar pitch lacquers.

Various modifications of the process of the invention may be made without departing from the spirit or scope thereof and it is to be understood that the invention is intended to be limited only as defined in the appended claims.

What we claim is:

1. A process for the production of pitch raw materials comprising extracting coal-tar pitch free of solids with a mixture of a supercritical gas extracting agent and at least one entrainer at elevated temperatures and pressures, passing the extraction mixture free of solids to a plurality of separation steps where the supercritical gas and entrainer are removed by lowering the pressure and/or raising the temperature to gradually reduce the density of the extracting agent, recycling the mixture of extracting agent and entrainer to the extraction step and recovering from the separation step a quinoline-insoluble pitch fraction, a toluene insoluble-quinoline soluble pitch fraction and a toluene-soluble pitch fraction and an ash rich fraction from the extraction step.

2. The process of claim 1 wherein the extracting agent is at least one member of the group consisting of aliphatic hydrocarbons of 2 to 5 carbon atoms, olefinic hydrocarbons of 2 to 5 carbon atoms and halogenated hydrocarbons of 1 to 4 carbon atoms.

3. The process of claim 1 wherein the extracting agent is a liquiefied petroleum gas.

4. The process of claim 1 wherein the entrainer is at least one member of the group consisting on mono- and polynuclear aromatic hydrocarbons, mono- and polynuclear aromatic hydrocarbons substituted with at least one member of the group consisting of alkyls of 1 to 2 carbon atoms and —$NH_2$ and non-hydrogenaed or partially or totally hydrogenated, mono- and binucler nitrogen heterocycles in which one or both nuclei are heterocyclic and aromatic carboxylic acid esters with alkanols of 1 to 6 carbon atoms.

5. The process of claim 1 wherein the entrainer is commercial benzene.

6. The process of claim 1 wherein the entrainer is crude benzene.

7. The process of claim 1 wherein the extrainer is a first cut of platformate having a boiling range of 70° to 200° C.

8. The process of claim 7 wherein the boiling range is 100° to 150° C.

9. The process of claim 1 wherein the entrainer is methyl naphthalene or a fraction containing methylnaphthalene.

10. The process of claim 2 wherein a mixture of entrainers is used.

11. The process of claim 1 wherein the mixture is a supercritical gas extracting agent and and an entrainer at temperatures of 80° to 300° C.

12. The process of claim 11 wherein the temperature is 120° to 250° C.

13. the process of claim 11 wherein the pressure is 80 to 300 bar.

14. The process of claim 11 wherein the pressure is 150 to 250 bar.

15. The process of claim 1 wherein the pitch concentration in the extraction mixture is 2 to 40% by weight.

16. The process of claim 1 wherein the pitch concentration in the entrainer mixture is 5 to 30% by weight.

17. A process for producing raw materials for carbon black production comprising extracting coal-tar pitch free of solids with a mixture of a supercritical gas extracting agent and an entrainer at elevated temperatures and pressures, passing the extraction mixture to at least one separation step where the supercritical gas and entrainer are removed by lowering the pressure and/or raising the temperature, recycling the mixture of extracting agent and entrainer to the extraction step and recovering the toluene-insoluble free pitch fraction from the separation step.

18. A process for the production of an impregnation agent for molded carbon bodies comprising extracting coal-tar pitch free of solids with a mixture of a supercritical gas extracting agent and an entrainer at elevated temperatures and pressures, passing the extraction mixture to at least one separation step where the supercritical gas and entrainer are removed by lowering the pressure and/or raising the temperature, recycling the mixture of extracting agent and entrainer to the extraction step and recovering the quinoline-insoluble free pitch fraction from the separation step.

19. A process for the production of an electrode binder comprising extracting coal-tar pitch free of solids with a mixture of a supercritical gas extracting agent and an entrainer at elevated temperatures and pressures, passing the extraction mixture to at least one separation step where the supercritical gas and entrainer are removed by lowering the pressure and/or raising the temperature, recycling the mixture of extracting agent and entrainer to the extraction step and recovering the ash-free pitch fraction from the separation step.

20. The process of claim 17 wherein the toluene-insoluble free pitch fraction is mixed with high-boiling aromatic hydrocarbons.

* * * * *